United States Patent Office 3,325,356
Patented June 13, 1967

3,325,356
COMPOSITIONS AND METHOD FOR TREATING HELMINTHIASIS
Joseph Di Netta, Elizabeth, and John R. Egerton, Neshanic Station, N.J., assignors to Merck & Co., Inc., Rahway, N.J., a corporation of New Jersey
No Drawing. Filed Aug. 20, 1965, Ser. No. 481,409
15 Claims. (Cl. 167—53)

This invention relates to compositions and methods useful in the treatment of parasitic diseases in animals. More particularly, the invention relates to compositions containing an imidazo compound and 2-substituted benzimidazoles in which the anthelmintic action of the composition is demonstrably enhanced over that expected from the activity of either ingredient when used alone, and to methods for using said compositions. Specifically, it relates to the methods and compositions above mentioned wherein the imidazo compound is 6-phenyl-2,3,5,6-tetrahydroimidazo[2,1-b]thiazole and acid addition salts thereof.

Helminthiasis is a widely occurring disease affecting animals, and causes large economic losses in the domesticated animal industry. Particularly susceptible to the disease are ruminants such as sheep, cattle, and goats, and equines such as horses and mules. A wide variety of anthelmintic agents have been discovered and have varying degrees of efficacy on the particular helminths causing the infections. Among such classes of materials is a family of 2-substituted benzimidazoles. Also of some interest has been a series of tetrahydroimidazo thiazoles which, while possessing anthelmintic activity, demonstrate certain toxic side effects which are potentially economically hazardous to the animal farmer. In view of the large economic interest in the prevention and control of helminthiasis, modern-day research, in addition to seeking new classes of anthelmintically active materials, is also directed to finding ways for eliminating disadvantages in, and improving the efficacy of, the currently known anthelmintic agents.

It is accordingly an object of the present invention to provide compositions possessing a high degree of anthelmintic activity. Another object is to provide compositions which contain effective anthelmintic and antifungal 2-substituted benzimidazoles and imidazo thiazole compounds in which the anthelmintic potency and efficacy of the composition is enhanced over the additive effect of the 2-substuited benzimidazole and imidazo compound. Yet a further object is to provide methods for treating helminthiasis with imidazo compounds with the substantial absence of significant toxic effects. Still another object is to provide a method for treating helminthiasis with compositions containing anthelmintically active 2-substituted benzimidazoles and imidazo compounds wherein the dosage levels are substantially reduced over those required when each is administered alone. These and other objects will appear from the detailed description which follows.

According to the present invention, it has been surprisingly discovered that the anthelmintic activity of 2-substituted benzimidazoles and certain tetrahydroimidazo thiazoles can be greatly enhanced when either of them is administered to the host animal in the presence of the other. Thus, in one of its preferred aspects, the invention provides novel 2-component compositions wherein one component is 6-phenyl-2,3,5,6-tetrahydroimidazo[2,1-b] thiazole or nontoxic acid addition salts thereof, and the other component is at least one anthelmintically active 2-substituted benzimidazole. The 2-substituted benzimidazoles contemplated for used in the present invention have the following structural formula:

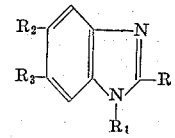

where R is thiazolyl, isothiazolyl, thiadiazolyl, pyrryl, furyl, halofuryl, thienyl, naphthyl, halonaphthyl, such as 2-naphthyl-3-fluoro pyridyl, pyrazinyl, coumarinyl, thiacoumarinyl, phenyl, or halophenyl, $R_1$ is hydrogen, hydroxy, alkoxy, lower alkyl, alkenyl, or acyl such as alkanoyl and aroyl, exemplified by acetyl, propionyl, butyryl, benzoyl, and the like, $R_2$ and $R_3$ are hydrogen, lower alkyl, lower alkoxy, halogen, phenyl, halophenyl, phenoxy, thienyl, or trifluoromethyl. Also contemplated for use are the nontoxic acid additions salts of the foregoing compounds. There may also be employed the nontoxic metal complexes or chelates of the foregoing benzimidazoles wherein $R_1$ is hydrogen. Typical of the 2-substituted benzimidazoles which may be employed are 2-(4'-thiazolyl)benzimidazole,
2-(2'-thiazolyl)benzimidazole,
2-(4'-thiazolyl)-5-methyl benzimidazole,
2-(2'-thiazolyl)-5,6-dimethyl benzimidazole,
2-(4'-thiazolyl)-5-trifluoromethyl benzimidazole,
2-(3'-thienyl)benzimidazole,
2-phenyl benzimidazole,
2-(2'-chlorophenyl)benzimidazole,
1-methyl-2-phenyl benzimidazole,
2-phenyl-5,6-dimethyl benzimidazole,
2-phenyl-5-ethoxy benzimidazole,
2-(2'-thienyl)benzimidazole,
1-methyl-2-(2'-thienyl)benzimidazole,
1,5-dimethyl-2-(2'-thienyl)benzimidazole,
2-(2'-thienyl)-5,6-dimethyl benzimidazole,
2-(2'-thienyl)-5-methyl benzimidazole,
1-ethyl-2-(3'-thienyl)benzimidazole,
1-allyl-2-(3'-thienyl)benzimidazole,
2-(3'-thienyl)-5,6-dimethoxy benzimidazole,
2-(2'-furyl)benzimidazole,
2-(3'-furyl)benzimidazole,
1-methallyl-2-(3'-furyl)benzimidazole,
1-butyl-2-(2'-furyl)benzimidazole,
2-(2'-pyrryl)benzimidazole,
2-(3'-pyrryl)benzimidazole,
1-ethyl-2-(2'-pyrryl)benzimidazole,
1-allyl-2-(3'-pyrryl)benzimidazole,
2-(2'-pyrryl)-5-ethoxy benzimidazole,
2-(2'-pyridyl)benzimidazole,
2-(3'-pyridyl)benzimidazole,
2-(2'-pyrazinyl)benzimidazole,
2-(3'-coumarinyl)benzimidazole,
2-(3'-thiacoumarinyl)benzimidazole, and 2-(2'-naphthyl)benzimidazole. Preferred among the foregoing for use in the present invention are 2-(4'-thiazolyl)benzimidazole, 2 - (2' - thiazolyl)benzimidazole, 2-phenyl benzimidazole, 2 - (3' - thienyl)benzimidazole, 2-(2'-thienyl)benzimidazole, 2-(2'-furyl)benzimidazole, and 2-(2'-pyrryl)benzimidazole, and most preferred is 2-(4'-thiazolyl)benzimidazole. Also, nontoxic acid addition salts of the foregoing compounds may be employed. Nontoxic is used in this specification in the sense that said salts do not produce intolerable side effects when administered at effective dosage levels. Such acid addition salts as are obtained from the hydrohalic acids, sulfuric acid, nitric acid, phosphoric acid, citric acid, acetic acid, propionic acid, oxalic acid, succinic acid, and the like may be used.

The nontoxic metal complexes or chelates are comprised of a metal salt and the 2-substituted benzimidazole with $R_1$ being hydrogen. They may normally be prepared by refluxing an aqueous mixture of the metal salt and the 2-substituted benzimidazole, preferably as the acid addition salt, and the resulting metal complex recovered by conventional techniques. The metal salts contemplated are those comprising an anion and a metal cation such as mercury, copper, lead, zinc, iron, cobalt, nickel, chromium, manganese, silver, cadmium, molybdenum, tungsten, or tin. The preferred metals are iron, cobalt, nickel, and copper. The anions are illustrated by the halides such as hydrochloride and hydrobromide, nitrate, sulfate, borate, carbonate, stannate, phosphate, nitrite, thiocyanate, perchlorate, permanganate, arsenate, stibnate, acetate, propionate, benzoate, and the like. The preferred metal salts are cobaltous chloride, cupric chloride, ferric chloride, cobaltous nitrate, ferrous sulfate, copper sulfate, cobalt propionate, iron acetate, mercuric bromide, copper acetate, and the like.

The imidazo compound used in the present invention is 6-phenyl-2,3,5,6-tetrahydroimidazo[2,1-b]thiazole and has the following structural formula

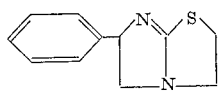

Also contemplated for use are the nontoxic acid addition salts of said compound. Such acid addition salts as are obtained from the hydrohalic acids, sulfuric, nitric, acetic, sulfonic, oxalic, phosphoric acid, and the like may be used. Preferred for use is the hydrochloride salt.

With regard to the individual amounts of the 2-substituted benzimidazole and the imidazo compound used in the compositions, it is a feature of the invention that reduced dosages of the order of from one-quarter to one-half those normally employed for the individual ingredients if used alone may be employed. Such amounts will depend upon the activity of the imidazo compound in the presence of the 2-substituted benzimidazole, and such should, of course, be considered in determining the amounts sufficient to provide an effective dosage for the proper treatment of the parasitic infection. These amounts will vary depending on the mode of treatment, the activity of the components, the size of the host, and the severity of infection. The compositions are especially effective against *Haemonchus contortus* and the strongyle species commonly found in sheep and cattle and ordinarily result in an overall efficacy of from about 1.5–2.5 times the efficacy that would be expected from the sum of the individual activities of each component if each were used alone. In this regard, neither of the active ingredients need be present at such dosage levels as to be anthelmintically active itself, it having been discovered that the compounds will display the augmented anthelmintic performance even when employed at levels which, if used alone, would not be anthelmintically active in the host. This is not a preferred mode of operation, however, but serves to demonstrate that the dosage level of each compound can be substantially reduced over use levels heretofore employed. Generally, when single unit dosage forms such as tablets, boluses, or drenches are desired to be administered to the animal, suitable results are obtained when the compositions contain enough of the benzimidazole, in the presence of the imidazo compound, to provide a dosage level of the benzimidazole of from 0.1–450 mg./kg. of animal body weight. Within this range, the preferred roundworm dosage level for ruminants and equines for the preferred benzimidazole compounds are as follows: 2-(4'-thiazolyl)benzimidazole and 2-(2'-thiazolyl)benzimidazole, 8–50 mg./kg.; 2-phenyl benzimidazole, 75–175 mg./kg.; the thienyl, pyrryl, and furyl benzimidazoles, 15–80 mg./kg.

The amount of imidazo compound used in the compositions in conjunction with the foregoing dosage levels of the benzimidazoles and for which the enhancing action will ordinarily be obtained is generally an amount sufficient to provide from about 0.10 to 1.5 times the benzimidazole dosage level. On a weight ratio basis, therefore, this range corresponds to a benzimidazole:imidazo compound ratio in the composition of from 1:0.10–1:1.5. Preferably, the ratio ranges from 1:0.25–1:1. Stated another way, the imidazo compound is suitably present in the compositions to the extent of from 10–150% and preferably 25–100% based on the weight of 2-substituted benzimidazole present in the composition. Best results are obtained from compositions containing 2-(4'-thiazolyl)-benzimidazole in amount sufficient to provide a dosage level of from 5–50 mg./kg. of body weight and sufficient of the imidazo compound to provide a dosage level of from 5–75 mg./kg. of animal body weight depending upon the particular parasites being treated.

The combined amounts of each compound in the composition, as well as the remaining constituents of the composition, will vary according to the type of treatment to be employed, the host animal, and the particular parasitic disease being treated. In general, however, compositions containing a total weight percent of the benzimidazole and imidazo compound ranging from 0.001 to 95% will be suitable, with the remainder being any suitable carrier or vehicle. Within this range, the relative amounts of benzimidazole compound to imidazo compound is not critical except to the extent that the resulting composition is pharmaceutically effective, considering the degree to which each compound enhances the anthelmintic activity of the composition as described above. When the compositions are to be solid unit dosage forms as in tablets or boluses, the ingredients other than the benzimidazoles and imidazo compound may be any other acceptable vehicles convenient in the preparation of such forms, and preferably materials nutritionally suitable such as starch, lactose, talc, magnesium stearate, vegetable gums, and the like. In such forms, the combined amounts of anthelmintic ingredients conveniently ranges from about 5% to 80% by weight of the total composition.

When the unit dosage form is to be in the form of a drench, the composition may additionally contain agents which will aid in the subsequent suspending of the benzimidazole in water, such as bentonite, clays, water soluble starches, cellulose derivatives, gums, surface active agents, and the like to form a dry predrench composition, and this predrench composition added to water just before use. The imidazo compound in the preferred form of hydrochloride is water soluble and hence requires no suspending agent. In the predrench formation, in addition to the suspending agent, such ingredients as preservatives, antifoaming compounds, and the like may be employed. Such a dry product may contain over 95% by weight of the anthelmintic compounds, the rest being contributed by the excipients. Preferably, the solid composition contains from 30% to 95% by weight of the combined weights of the benzimidazole and imidazo compound. Enough water should be added to the solid product to provide the proper dosage level within a convenient amount of liquid for a single oral dose. A commonly used measure in the field is one fluid ounce of material and thus that one fluid ounce of material should contain enough of the compounds to provide the effective dosage level. Liquid drench formulations containing from about 10 to 80 percent by weight of dry ingredients will, in general, be suitable, with the preferred range being from 15 to 50 weight percent.

Where the compositions are intended to be used as feeds, feed supplements, or feed premixes, they will be mixed with suitable ingredients of an animal's nutrient ration. The solid orally ingestible carriers normally used for such purposes, such as distillers' dried grains, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone, and the like are all suitable. The anthelmintic agents are intimately dispersed or admixed throughout the solid inert carrier by methods such as grinding, stirring, milling, or tumbling. By selecting proper diluents and by altering the ratio of carrier to active ingredients, compositions of any desired concentration may be prepared. Feed supplement formulations containing from about 5% to about 50% by weight, and preferably from about 10–30% by weight of active ingredient are particularly suitable for addition to feeds. The active compounds are normally dispersed or mixed uniformly in the diluent but in some instances may be adsorbed on the carrier.

These supplements are added to the finished animal feed in an amount adequate to give the final concentration desired for controlling or treating helminthiasis by way of the animal ration. Although the preferred level in feeds will depend on the particular compounds being employed, the combined weights of benzimidazole and imidazo compound of this invention are normally fed at levels of 0.05–25% in the feed. Where the treatment is prophylactic, smaller amounts may be employed, suitably of the order of 0.001–3.0 weight percent based on the weight of feed, and may be administered over long periods. An advantageous method of administering the compositions of this invention to animals whose feeds are conveniently pelleted, such as sheep, is to incorporate them directly in the pellets. For instance, the compositions of the present invention are readily incorporated in nutritionally adequate alfalfa pellets (during the pelleting operation) at levels of about 2 to 110 grams per pound of pellets for therapeutic use, and at lower levels for prophylactic use, and such pellets fed to the worm-infected animals. Alternatively, the anthelmintic compositions may be incorporated in salt licks or salt blocks at any desired concentration (concentrations of 5–25% by weight are conveniently employed). Large animals, such as sheep and cattle, then receive the anthelmintics with their salt.

Although it is preferred to administer the imidazo compound with the 2-substituted benzimidazole together in a single composition, it is an added feature of the invention that the two compounds need not be administered simultaneously in one formulation. They may be administered separately, each in its own formulation if desired, to obtain the enhancing action referred to, provided that the administration of each is performed within such period of time as will allow the beneficial interaction between the benzimidazole and imidazo compound against the helminths. This period of time will vary between different species of animal and from compound to compound. However, administration of one compound within as much as six hours of the other may be performed. If this mode of operation is practiced, the period is preferably not more than one hour.

The 2-substituted benzimidazoles wherein $R_1$ is hydroxy or alkoxy may be prepared by treating an o-nitroanilide of the formula

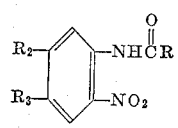

where R, $R_2$, and $R_3$ are as previously defined, in a heterogeneous solvent system containing water and an organic solvent immiscible in water to reduce the nitro group to the hydroxylamino group. Solvents such as benzene, toluene, and the like may be employed. The reducing agents particularly suitable for the conversion are water soluble metal hydrosulfides, for example, ammonium hydrosulfide or sodium hydrosulfide or potassium hydrosulfide. The reduction is preferably carried out at temperatures from about 0° C. to about 25° C. As a result of this operation, the 2-substituted benzimidazoles wherein $R_1$ is hydroxy are obtained, ring closure being effected in the reducing step. Example 4 hereinafter shows a method which may be employed generally to produce said compounds.

The 2-substituted benzimidazoles werein $R_1$ is alkoxy are prepared from the foregoing 2-substituted benzimidazoles wherein $R_1$ is hydroxy by treating the hydroxy compound with a strong base and alkylating agent corresponding to the alkyl moiety of the alkoxy group desired at $R_1$. Suitable bases are alkali metal hydroxides such as sodium and potassium hydroxide whereas suitable alkylating agents are methyl and ethyl iodide, dimethyl sulfate, diethyl sulfate, and the like. The temperature of the reaction is preferably maintained at between 40 and 120° C. The alkoxy substituted benzimidazole may be isolated and purified by techniques well known in the art. Example 5 appearing hereinafter is considered to be representative of methods for preparing the alkoxides. Example 6 appearing hereinafter is considered to be representative of a method for preparing the metal complexes or chelates of those 2-substituted benzimidazoles wherein $R_1$ is hydrogen previously referred to.

The 6-phenyl-2,3,5,6-tetrahydroimidazo[2,1-b]thiazole is prepared by reacting together phenacyl halide and 2-amino-2-thiazoline to produce 2-imino-3-phenacylthiazolidine hydrohalide, said reaction being conducted in a solvent medium in which the reactants are soluble and the thiazolidine salt is insoluble, neutralizing said 2-imino-3-phenacylthiazolidine hydrohalide with base, reacting the 2-imino-3-phenacylthiazolidine thus obtained with alkali metal borohydride to produce 3-α-hydroxyphenylethyl-2-iminothiazolidine and treating said latter substance with concentrated sulfuric acid. The free compound may be converted to the acid addition salt by treatment with acids such as hydrochloric, hydrobromic, pamoic, sulfonic, acetic, benzoic, and the like. Example 7 is intended to be representative of a method for producing the imidazo compound.

The following examples are given for the purpose of illustration only and not by way of limitation.

*Example 1*

Experimental infections of the large stomach worm *Haemonchus contortus*, of sheep are established in Haemonchus-free hosts. Three groups of separate drench suspensions are prepared, two of which employ a 2% (w./v.) methyl cellulose aqueous suspension vehicle. The third group is made up of aqueous solutions containing 6-phenyl - 2,3,5,6-tetrahydroimidazo[2,1-b]thiazole hydrochloride alone. Of the two methyl cellulose-containing drenches, one group is comprised of individual drenches containing the two-component compositions listed in Table I. The other group is comprised of drenches containing 2-(4'-thiazolyl)benzimidazole alone. Each drench is administered as a single oral dose to separate groups of hosts at the indicated dosage level. At the time of treatment, the infection is eight days old and in a stage of development generally considered to be least responsive to chemotherapy. Worms remaining after treatment are determined at necropsy two days after dosing. Efficacy is determined as percent reduction in number of *Haemonchus contortus* in treated animals compared to the number harbored by untreated infected control animals. The percent reduction in worms is calculated from the formula $$\frac{Hc - Ht}{Hc} \times 100 = \text{percent reduction}$$

where Hc is the average number of Haemonchus in untreated infected control animals and Ht is the average number of Haemonchus in the treated group. The efficacy of the formulations containing both the imidazo compound and the 2-(4'-thiazolyl)benzimidazole is compared in Table I to the expected efficacy expressed as the sum of the activities of each compound when administered alone at the same dosage level as is employed in the composition.

TABLE I

| Composition | Dosage, mg./kg. | Efficacy, Percent Reduction From Composition | |
|---|---|---|---|
| | | Actual Percent | Expected Percent* |
| 2-(4'-thiazolyl)benzimidazole + 6-phenyl-2,3,5,6-tetrahydro-imidazo[2,1-b]thiazole hydrochloride. | 10+10 | 50 | 33 |
| 2-(4'-thiazolyl)benzimidazole + 6-phenyl-2,3,5,6-tetrahydro-imidazo[2,1-b]thiazole hydrochloride. | 10+5 | 48 | 20 |
| 2-(4'-thiazolyl)benzimidazole + 6-phenyl-2,3,5,6-tetrahydro-imidazo[2,1-b]thiazole hydrochloride. | 5+5 | 23 | |
| 2-(4'-thiazolyl)benzimidazole | 10 | 20 | |
| 2-(4'-thiazolyl)benzimidazole | 5 | 0 | |
| 6-phenyl-2,3,5,6-tetrahydro-imidazo[2,1-b]thiazole hydrochloride | 10 | 13 | |
| 6-phenyl-2,3,5,6-tetrahydro-imidazo[2,1-b]thiazole hydrochloride | 5 | 0 | |

*The sum of percent reductions for the imidazo compound and the 2-(4'-thiazolyl)benz)-imidazole when administered alone.

As can be seen from the foregoing table, the actual efficacy of the compositions containing both the imidazo compound and the benzimidazole far exceed what is to be expected from the sum of individual activities. It is also to be noted that such efficacy is obtained even when the dosage levels of each compound, if used alone, would be anthelmintically inactive.

*Example 2*

A drench is prepared by suspending the following ingredients in one quart of water. The ingredients may be blended into a dry mix first and the entire mix added to the water or they may be individually added to the water.

| | Grams |
|---|---|
| 2-(4'-thiazolyl)benzimidazole | 25.0 |
| 6-phenyl-2,3,5,6-tetrahydroimidazo[2,1-b]thiazole hydrochloride | 12.5 |
| Polysorbate 80 polyoxyethylene (20) sorbitan monooleate (Tween 80; available from Atlas Chem. Co.) | 0.13 |
| Sorbitan monolaurate (Span 20; available from Atlas Chem. Co.) | 0.13 |
| Antifoam AF (emulsion of dimethylpolysiloxane; available from Dow-Corning) | 0.06 |
| Pregelatinized starch | 40.7 |
| | 78.52 |

The total volume of the drench obtained after one quart of water is added is about 33 fluid ounces. Each fluid ounce contains about 0.759 g. of 2-(4'-thiazolyl)benzimidazole and about 0.38 g. of 6-phenyl-2,3,5,6-tetrahydroimidazo[2,1-b]thiazole hydrochloride.

*Example 3*

A bolus containing 2-phenyl benzimidazole and 6-phenyl-2,3,5,6-tetrahydroimidazo[2,1-b]thiazole hydrochloride suitable for oral administration to domesticated animals of about 50 pounds of body weight is prepared from the following ingredients:

| | Grams |
|---|---|
| 2-phenyl benzimidazole | 3.3 |
| 6-phenyl-2,3,5,6-tetrahydroimidazo[2,1-b]thiazole hydrochloride | 1.1 |
| Dicalcium phosphate | 3.0 |
| Starch | 0.535 |
| Guar gum | 0.15 |
| Talc | 0.14 |
| Magnesium stearate | 0.04 |
| | 8.265 |

The dicalcium phosphate is thoroughly mixed with the 2-phenyl benzimidazole and the 6-phenyl-2,3,5,6-tetrahydroimidazo[2,1-b]thiazole hydrochloride and the mixture reduced to a particle size finer than 60 mesh. To the mixture is added 0.330 g. of starch in the form of an aqueous starch paste and the resulting mixture granulated in the usual manner. The granules are then passed through a No. 10 mesh screen and dried at 110°–130° F. for about 18 hours, and the dried material then passed through a No. 16 mesh screen. The guar gum and the balance of the starch are added and the mixture thoroughly blended. The remainder of the ingredients are then added and the whole thoroughly mixed and compressed.

*Example 4*

*2-(4'-thiazolyl)benzimidazole-1-oxide.*—To a solution of 24.92 g. of N-(o-nitrophenyl)thiazole-4-carboxamide in 350 ml. methylene chloride is added 27.6 g. of sodium hydrosulfide dihydrate in 200 ml. of water over two hours at 5° C. Calcium chloride (10.0 g.) in 20 ml. of water is then added and the mixture is stirred vigorously at 5° C. for six hours and at room temperature for 18 hours. After addition of 10 g. of ammonium chloride and one hour of stirring, the solid is filtered and washed with water. It is then dissolved in 200 ml. of water by addition of 10% hydrochloric acid until pH 1.2 is achieved. Insoluble impurities are filtered off and the pH of the clear filtrate is adjusted to pH 7 by addition of 6 N ammonium hydroxide. The precipitate is filtered, washed with water, and dried in vacuo. Substantially pure 2-(4'-thiazolyl)benzimidazole-1-oxide is obtained by recrystallization of the crude material from ethanol; M.P. 237–238° C.

*Example 5*

*1-methoxy-2-(4'-thiazolyl)benzimidazole.*—2-(4'-thiazolyl)benzimidazole-1-oxide (0.651 g.) is added to a solution of 0.12 g. of sodium hydroxide in 6 ml. of methanol. To the clear solution is added 0.465 g. of methyliodide and the mixture is heated at 55°–60° C. for five hours. The solvent is removed in vacuo. The oily residue is diluted with 5 ml. of water and solidifies on standing. 1-methoxy-2-(4'-thiazolyl)benzimidazole is separated by filtration, washed with water, and recrystallized from (1:1) methanol-water; M.P. 117–118° C.

*Example 6*

*Iron sulfate-2-(4'-thiazolyl)benzimidazole complex.*—0.2 mole of 2-(4'-thiazolyl)benzimidazole and 0.3 mole of ferrous sulfate are admixed and 130 ml. of water are added thereto. The mixture is refluxed for two hours. The resulting suspension is cooled, filtered, the iron sulfate- 2-(4'-thiazolyl)benzimidazole complex formed is washed with water, and dried at 80° C. in vacuo. The product contains 67.8 weight percent of 2-(4'-thiazolyl)benzimidazole.

*Example 7*

6 - *phenyl-2,3,5,6-tetrahydroimidazo[2,1-b]thiazole.*—A solution of 60 g. of 2-amino-2-thiazoline in 1.5 liters of methylethyl ketone is mixed at room temperature with a solution of 120 g. of phenacyl bromide in 500 ml. of methylethyl ketone. The reaction mixture is held at room temperature for 30 minutes during which time the hydrobromide salt of 2-imino-3-phenacylthiazolidine crystallizes. At the end of the reaction period, the crystalline product is collected by filtration, washed with acetone, and dried to give substantially pure material, M.P. 205–206° C. 163 g. of acid addition salt is obtained.

The 163 g. of 2-imino-3-phenacylthiazolidine hydrobromide obtained above is added to a solution of 163 g. of potassium carbonate in 3 liters of water, and the resulting mixture stirred for one hour at room temperature. 2-imino-3-phenacylthiazolidine precipitates. It is collected by filtration, washed with water, and dried to give 100 g. of product, M.P. 67–68° C.

6 g. of sodium borohydride is added at room temperature to a stirred suspension of 100 g. of 2-imino-3-phenacylthiazolidine in 1 liter of methanol. The mixture is stirred at room temperature for one hour during which time all of the solid goes into solution.

1.5 liters of water is then added to the reaction mixture and the resulting mixture chilled to about 10° C. 3-α-hydroxyphenylethyl-2-iminothiazolidine crystallizes. The solid product is recovered by filtration and washed with water to give 93 g., M.P. 124–125° C.

93 g. of 3-α-hydroxyphenylethyl-2-iminothiazolidine is added, with stirring and ice bath cooling, to 930 ml. of concentrated sulfuric acid. The addition is carried out under a nitrogen atmosphere. The resulting solution is stirred for one hour without external cooling during which time the temperature rises to about room temperature. It is then diluted with ice water and made basic with 50% sodium hydroxide solution. 6-phenyl-2,3,5,6-tetrahydroimidazo[2,1-b]thiazole precipitates as an oil. The precipitate crystallizes quickly and the crystals are collected by filtration and washed with water. 70 g. of 6-phenyl-2,3,5,6-tetrahydroimidazo[2,1-b]thiazole are obtained, M.P. 92–93° C.

This product is dissolved in 2 liters of acetone and 70 ml. of concentrated hydrochloric acid added to the solution. 6-phenyl-2,3,5,6-tetrahydroimidazo[2,1-b]thiazole hydrochloride crystallizes and is recovered by filtration. 62 g. of solid are obtained, M.P. 262–263° C. Additional hydrochloride salt may be recovered from the acetone filtrate.

Any departure from the above description which conforms to the present invention is intended to be included within the scope of the claims.

What is claimed is:

1. The method for treating helminthiasis which comprises orally administering to an animal an effective amount of a 2- substituted benzimidazole selected from the group consisting of compounds of the formula

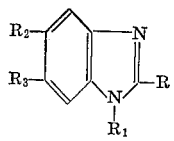

where R is selected from the group consisting of thiazolyl, isothiazolyl, thiadiazolyl, pyrryl, furyl, halofuryl, thienyl, naphthyl, halonaphthyl, pyrazinyl, pyridyl, coumarinyl, thiacoumarinyl, phenyl, and halophenyl, $R_1$ is selected from the group consisting of hydrogen, hydroxy, alkoxy, lower alkyl, lower alkenyl, lower alkanoyl, and benzoyl, and $R_2$ and $R_3$ are selected from the group consisting of hydrogen, lower alkyl, lower alkoxy, halogen, phenyl, halophenyl, phenoxy, thienyl, and trifluoromethyl, nontoxic acid addition salts thereof, and nontoxic metal complexes of said benzimidazoles wherein $R_1$ is hydrogen, and an effective amount of an imidazo compound selected from the group consisting of 6-phenyl-2,3,5,6-tetrahydroimidazo[2,1-b]thiazole and nontoxic acid addition salts thereof, said administering taking place within such period of time as will allow a beneficial interaction between said benzimidazole and said imidazo compound upon said animal.

2. The method according to claim 1 wherein the 2-substituted benzimidazole is 2-(4'-thiazolyl)benzimidazole.

3. The method according to claim 2 wherein the imidazo compound is in the free base form.

4. The method according to claim 2 wherein the imidazo compound is in the form of the acid addition salt.

5. The method according to claim 4 wherein the acid addition salt is the hydrochloride.

6. A composition comprising a 2-substituted benzimidazole selected from the group consisting of compounds of the formula

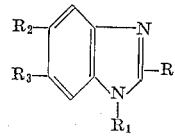

where R is selected from the group consisting of thiazolyl, isothiazolyl, thiadiazolyl, pyrryl, furyl, halofuryl, thienyl, naphthyl, halonaphthyl, pyrazinyl, pyridyl, coumarinyl, thiacoumarinyl, phenyl, and halophenyl, $R_1$ is selected from the group consisting of hydrogen, hydroxy, alkoxy, lower alkyl, lower alkenyl, lower alkanoyl, and benzoyl, and $R_2$ and $R_3$ are selected from the group consisting of hydrogen, lower alkyl, lower alkoxy, halogen, phenyl, halophenyl, phenoxy, thienyl, and trifluoromethyl, nontoxic acid addition salts thereof, and nontoxic metal complexes of said benzimidazoles wherein $R_1$ is hydrogen, and an imidazo compound selected from the group consisting of 6-phenyl-2,3,5,6-tetrahydroimidazo[2,1-b]thiazole and nontoxic acid addition salts thereof, the weight ratio of benzimidazole compound to imidazo compound in said composition being from 1:0.10 to 1:1.5.

7. The composition according to claim 6 wherein the 2-substituted benzimidazole is 2-(4' - thiazolyl)benzimidazole.

8. The composition according to claim 7 wherein the imidazo compound is in free base form.

9. The composition according to claim 7 wherein the imidazo compound is in the form of the acid addition salt.

10. The composition according to claim 9 wherein the acid addition salt is the hydrochloride.

11. The composition according to claim 10 wherein the combined weights of said benzimidazole and said hydrochloride constitute from 0.001 to 95 weight percent of said composition and the remainder of the composition is a carrier.

12. The composition according to claim 11 wherein the composition additionally contains a suspending agent.

13. A composition which comprises water and the composition of claim 12.

14. The composition according to claim 12 wherein the ratio of 2-(4'-thiazolyl)benzimidazole to 6-phenyl-2,3,5,6 - tetrahydroimidazo[2,1-b]thiazole hydrochloride ranges from 1:0.1 to 1:1.5.

15. A composition which comprises water and the composition of claim 14.

No references cited.

ALBERT T. MEYERS, *Primary Examiner.*

STANLEY J. FRIEDMAN, *Assistant Examiner.*